(12) United States Patent
Thomasset et al.

(10) Patent No.: US 11,400,683 B2
(45) Date of Patent: Aug. 2, 2022

(54) MULTILAYER PLASTIC TUBE STRUCTURE

(71) Applicant: AISAPACK HOLDING SA, Vouvry (CH)

(72) Inventors: Jacques Thomasset, Neuvecelle (FR); Stéphane Mathieu, Publier (FR); Régine Tornay, Champex-Lac (CH)

(73) Assignee: AISAPACK HOLDING SA, Vouvry (CH)

( * ) Notice: Subject to any disclaimer, the term of this patent is extended or adjusted under 35 U.S.C. 154(b) by 76 days.

(21) Appl. No.: 16/610,364

(22) PCT Filed: Apr. 30, 2018

(86) PCT No.: PCT/IB2018/052979
§ 371 (c)(1),
(2) Date: Nov. 1, 2019

(87) PCT Pub. No.: WO2018/203210
PCT Pub. Date: Nov. 8, 2018

(65) Prior Publication Data
US 2020/0070464 A1      Mar. 5, 2020

(30) Foreign Application Priority Data

May 3, 2017  (WO) .................. PCT/IB2017/052563

(51) Int. Cl.
*B32B 1/08* (2006.01)
*B32B 27/08* (2006.01)
(Continued)

(52) U.S. Cl.
CPC ................ *B32B 1/08* (2013.01); *B32B 7/022* (2019.01); *B32B 27/08* (2013.01);
(Continued)

(58) Field of Classification Search
CPC .............. B32B 1/08; B32B 2307/7244; B32B 2307/54; B32B 15/20; B32B 15/08; B32B 27/08
See application file for complete search history.

(56) References Cited

U.S. PATENT DOCUMENTS

| 4,401,136 A | 8/1983 | Porrmann et al. |
| 9,352,881 B2 | 5/2016 | Medico et al. |

(Continued)

FOREIGN PATENT DOCUMENTS

| CN | 101415613 A | 4/2009 |
| CN | 102821937 A | 12/2012 |

(Continued)

OTHER PUBLICATIONS

International Search Report for PCT/IB2018/052979, dated Jul. 10, 2018, 5 pages.
(Continued)

*Primary Examiner* — Michael C Miggins
(74) *Attorney, Agent, or Firm* — Nixon & Vanderhye P.C.

(57) ABSTRACT

Multilayer skirt of a flexible tube, comprising an extruded main layer (9) and a mono- or multilayer film (10) at least partially surrounding the main layer. The tensile modulus of the main layer is less than 1200 N/mm² and the tensile modulus of the film is greater than 3500 N/mm².

24 Claims, 6 Drawing Sheets

(51) Int. Cl.
  *B32B 7/022* (2019.01)
  *B29K 23/00* (2006.01)
  *B32B 15/08* (2006.01)
  *B32B 15/20* (2006.01)

(52) U.S. Cl.
  CPC ....... *B29K 2023/0625* (2013.01); *B32B 15/08* (2013.01); *B32B 15/20* (2013.01); *B32B 2307/54* (2013.01); *B32B 2307/7244* (2013.01)

(56) References Cited

U.S. PATENT DOCUMENTS

| | | | |
|---|---|---|---|
| 2006/0121228 | A1 | 6/2006 | Kim et al. |
| 2009/0092792 | A1 | 4/2009 | Thomasset et al. |
| 2009/0176044 | A1* | 7/2009 | Thomasset .......... B29C 66/1142 428/35.2 |
| 2010/0000674 | A1* | 1/2010 | Voigtmann ........ B29C 66/00441 156/280 |
| 2015/0013818 | A1* | 1/2015 | Ashman ................ B32B 27/32 138/109 |
| 2015/0203252 | A1* | 7/2015 | Dambricourt ....... B29C 45/0001 222/107 |
| 2015/0336726 | A1 | 11/2015 | Suter et al. |
| 2016/0272389 | A1 | 9/2016 | Wang et al. |

FOREIGN PATENT DOCUMENTS

| | | |
|---|---|---|
| CN | 105636777 A | 6/2016 |
| DE | 3045086 A1 | 6/1982 |
| JP | 2001-001432 A | 1/2001 |
| JP | 2001-121649 A | 5/2001 |
| JP | 2001-278293 A | 10/2001 |
| JP | 2003-267431 A | 9/2003 |
| JP | 2009-532296 A | 9/2009 |
| JP | 2010-024354 A | 2/2010 |
| JP | 2013-177645 A | 9/2013 |
| JP | 2014-129103 A | 7/2014 |
| JP | 6032450 B1 | 11/2016 |
| KR | 2013-0141515 A | 12/2013 |
| KR | 10-1355847 B1 | 1/2014 |
| WO | 2011/083499 A2 | 7/2011 |

OTHER PUBLICATIONS

Written Opinion of the ISA for PCT/IB2018/052979, dated Jul. 10, 2018, 5 pages.
First Office Action dated Feb. 1, 2021, issued in China Application No. 201880028919.8 and English translation, 23 pages.
Examination Report dated Apr. 8, 2021, issued in India Application No. 201917049815, 8 pages.
Inquiry dated Jun. 23, 2021, issued in Russian Federation Application No. 2019138015/05(074907), 5 pages.
Search Report dated Jun. 23, 2021, issued in Russian Federation Application No. 2019138015/05(074907), 2 pages.
Notice of Reasons for Rejection dated Mar. 1, 2022, issued in Japan Patent Application No. 2019-560085, 10 pages.
Notice of Preliminary Rejection dated Dec. 30, 2021, issued in Korea Application No. 10-2019-7035738, 9 pages.

* cited by examiner

MULTILAYER PLASTIC TUBE STRUCTURE

CROSS-REFERENCE TO RELATED APPLICATIONS

The present application is the U.S. national phase of International Application No. PCT/IB2018/052979 filed 30 Apr. 2018, which designated the U.S. and claims the priority of the prior application No. PCT/IB2017/052563 filed May 3, 2017, the entire contents of each of which are hereby incorporated by reference.

FIELD OF THE INVENTION

The invention lies in the field of flexible packaging tubes for liquid or viscous products. More specifically, it relates to labeled seamless flexible tubes that exhibit an elastic behavior, that is to say that recover their initial shape after deformation.

PRIOR ART

Thin and flexible plastic tubes are used for a variety of different packaging, such as hygiene items, cosmetics and food products. The contents of these tubes may consequently be for example styling gel, toothpaste, shampoo, lotion or liquid soap. For hygiene items and cosmetics, it is important that the tube is attractive and decorative, for example on a shelf in a shop or on a bathroom shelf. It is also important that product information printed on the packaging is conveyed in a clear and easily understandable manner to a buyer or to a user of the packaged product. For these reasons, the tubes are generally provided with direct printing or a film that can be printed with the desired pattern and text.

Tubes exist, the polyethylene skirt of which is extruded or coextruded. A tube head is then assembled to the skirt by overmolding or welding, then the tube obtained is finally printed and decorated. These tubes are widely used for producing cosmetic or pharmaceutical tubes because they exhibit resistance to stress cracking, suited to the preservation of sensitive formulas, and have esthetic qualities suited to the demands of this market. However, this packaging has two important disadvantages. The first disadvantage lies in the decoration of the tubular bodies, which requires sophisticated equipment and generates significant additional cost. The second disadvantage is associated with the limited choice of materials that can be used to form the single-layer or multilayer structure by extrusion or coextrusion. This leads to limitations of the packaging for certain properties, for instance the elasticity of the tubular body which enables the packaging to recover its shape after deformation.

Thin-walled plastic tubes, previously extruded and subsequently labeled, exist. These tubes require labels that are adhesively bonded to the tube at room temperature. The labeling materials suitable for a subsequent application are not weldable, which means that it must be ensured that they do not extend into the end closure of the tube, which is a thermal weld. The labeling materials are furthermore relatively stiff, which makes it necessary for the label to stop a little below the edge between the body of the tube and the shoulder of the tube. A conventional tube label, applied subsequently and which extends too close to the transition between the body of the tube and the shoulder of the tube, may otherwise jut out from the wall of the tube or form a creased edge. This phenomenon must obviously be avoided since it gives the tube an unattractive appearance.

One of the ways to apply labels to the tubes is by what is referred to as "in-mold labeling", IML, that is to say by overmolding a label previously deposited in an injection mold. IML tubes offer a certain number of advantages, especially regarding the appearance of the finished container. For example, it is possible to produce a glossy or matte label surface which may have the effect of giving the container an elegant appearance. The disadvantage of IML tubes is associated with the fact that they must be injected from specific resins or resin mixtures for the injection molding of a thin-walled article. As a result, certain properties of the packaging are reduced, in particular the resistance to stress cracking as well as the flexibility of the injected resin.

GENERAL DISCLOSURE OF THE INVENTION

The invention makes it possible to overcome the abovementioned disadvantages by offering a labeled tube having the advantages of the extruded tube and of the IML tube and not having the disadvantages thereof.

In addition, the invention makes it possible to obtain elasticity properties that are astonishingly improved compared to an extruded tube.

In one embodiment, the invention relates to a multilayer flexible tube skirt comprising an extruded main layer and a single-layer or multilayer film at least partially surrounding the main layer. The tensile modulus of the main layer is less than 1200 N/mm$^2$ and the tensile modulus of the film is greater than 3500 N/mm$^2$.

In one embodiment, the tensile modulus of the main layer is preferably less than 500 N/mm$^2$.

In one embodiment, the film comprises two layers, at least one of which has a tensile modulus of greater than 3500 N/mm$^2$. In one embodiment, the other of said two layers of the film has a tensile modulus of greater than 100 N/mm$^2$.

In one embodiment, the thickness of the main layer may represent between 80 and 97% of the thickness of the skirt.

In one embodiment, the thickness of the main layer may be between 190 and 680 microns.

In one embodiment, the thickness of the main layer may be between 250 and 550 microns.

In one embodiment, the thickness of the skirt may be between 200 and 700 microns and preferably between 300 and 600 microns.

In one embodiment, the main layer may be composed as follows:

| | |
|---|---|
| 45% HDPE Hostalen GF 4750 | MFR: 0.4 g/10 min |
| 45% LDPE ExxonMobil 165 | MFR: 0.33 g/10 min |
| 10% LLDPE Dowlex 2045 G | MFR: 1 g/10 min. |

In one embodiment, the main layer may be composed as follows:

| | |
|---|---|
| 80% LDPE ExxonMobil 165 | MFR: 0.33 g/10 min |
| 20% LLDPE Dowlex 2045 G | MFR: 1 g/10 min. |

In one embodiment, the skirt may have an absorbed energy ratio of greater than 60% and preferably greater than 80%.

In one embodiment, the ends of the film may be placed end to end.

In one embodiment, the ends of the film may have a space between them.

In one embodiment, the ends of the film may have an overlap.

In one embodiment, a strip may be added to the ends of the film.

In one embodiment, the strip may be placed between the main layer and the film or on the film.

In one embodiment, the main layer may be multilayer and coextruded.

In one embodiment, the main layer may comprise an oxygen barrier layer.

In one embodiment, the barrier layer may be a layer comprising an EVOH resin for example.

In one embodiment, the main layer may comprise a layer of recycled material(s).

In one embodiment, the film may comprise a multilayer structure.

In one embodiment, the film may comprise an oxygen barrier layer.

In one embodiment, the barrier layer may be a layer of EVOH resin and/or a metallized layer and/or a metal layer.

In one embodiment, the metal layer may be a layer comprising aluminum.

In one embodiment, the invention relates to a product comprising at least one skirt as defined in the present application. The product may be a tube or another packaging or another object.

Definition of the Terms Used in the Disclosure of the Invention

The following terms and abbreviations are used in the disclosure of the invention:
Multilayer film: film comprising several layers. The multilayer film may be obtained by coextrusion or/and lamination.
PET: biaxially oriented polyethylene terephthalate
BOPP: biaxially oriented polypropylene
PA: polyamide
PE: polyethylene
LDPE: low-density polyethylene
LLDPE: linear low-density polyethylene
HDPE: high-density polyethylene
EVOH: ethylene vinyl alcohol
Adhesive: glue used to combine several layers by lamination

DETAILED DESCRIPTION OF THE INVENTION

The invention will be better understood from the description of non-limiting embodiments thereof and the appended figures, in which FIGS. 1 and 2a to 2d illustrate sectional embodiments of skirts according to the invention;

Figure 1:
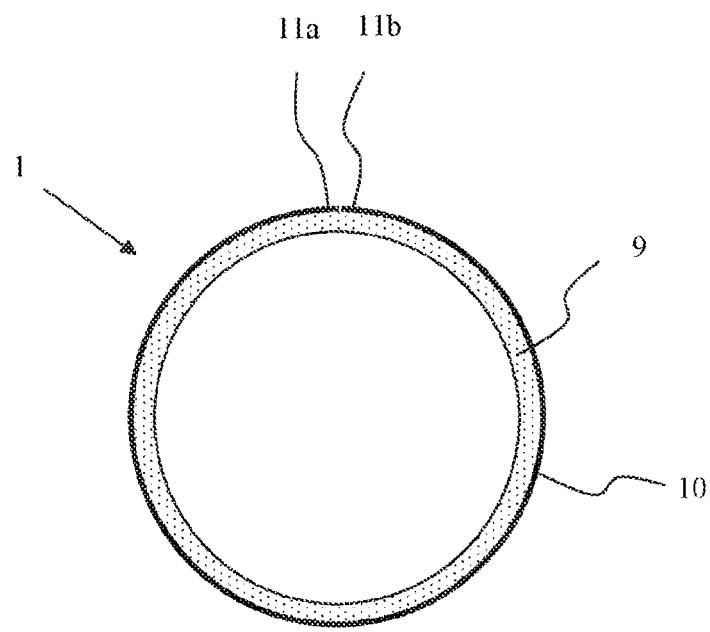

The invention relates especially to the flexible part of the tube, referred to as skirt in the following description of the invention.

More specifically, the invention relates to a multilayer skirt 1 of a flexible tube 18 as defined in the claims and illustrated especially in FIGS. 1 and 2a to 2d which will be described in detail below.

In order to form a tube 18, the skirt 1 is connected at its first end to a tube head comprising a neck 15 and is flat-welded at its second end 17 in order to close the packaging in a leaktight manner. The tube head may also comprise a dependent or independent cap 16 to close and open the packaging.

The skirt 1 according to the invention simultaneously has high elasticity, high resistance to stress cracking and also a high barrier to water vapor or oxygen.

The thickness of the skirt 1 is preferably between 200 and 700 microns and in particular between 300 and 600 microns.

According to the invention, the multilayer skirt comprises an extruded main tubular layer 9, preferably forming between 80 and 97% of the total thickness. The main layer 9 preferably forms the inner layer of the skirt 1 which is in contact with the packaged product. This layer 9 does not have any property discontinuity in the circumferential direction, since it results from the direct extrusion of a tubular body. The homogeneity of the properties of the main layer 9 over its circumference, in particular the absence of the weld zone along the axial direction of the packaging, makes it possible to avoid zones which are fragile in terms of stress cracking along the welds. The thickness of the main layer 9 is advantageously between 190 and 680 microns and preferably between 250 and 550 microns. Other dimensions are of course possible, depending on the circumstances.

The main layer 9 is advantageously formed of a resin or of a mixture of resins particularly resistant to stress cracking due to their high molar mass. The MFR (190° C., 2.16 kg, measured according to standard ISO 1133) of the resin or the resin mixture forming the main layer is less than 4 and preferably less than 1.

Example 1 for the Main Layer

| | |
|---|---|
| 45% HDPE Hostalen GF 4750 | MFR: 0.4 g/10 min |
| 45% LDPE ExxonMobil 165 | MFR: 0.33 g/10 min |
| 10% LLDPE Dowlex 2045 G | MFR: 1 g/10 min. |

Example 2 for the Main Layer

| | |
|---|---|
| 80% LDPE ExxonMobil 165 | MFR: 0.33 g/10 min |
| 20% LLDPE Dowlex 2045 G | MFR: 0.7 g/10 min. |

According to one embodiment of the invention, the extruded main layer 9 forms a multilayer structure obtained by coextrusion. For example, said extruded main layer 9 comprises one or more layers of polyethylene and an oxygen barrier layer and thin binder layers. Preferably, the thickness of the barrier layer represents no more than 10% of the thickness of the main layer 9, and preferably the thickness thereof is less than 7% of the thickness of said main layer 9. The barrier layer is for example an EVOH layer.

Said main layer 9 may also contain one or more recycled resin layers. For reasons of food compatibility, it is generally recommended to avoid the recycled layers forming the inner layer of the packaging and being in contact with the packaged product.

The main layer 9 is at least partially covered by a decorated film 10 forming the visible face of the skirt 1. The thickness of the decorated film 10 is between 10 and 120 microns and preferably between 30 and 80 microns. Other dimensions are of course possible. Preferably, the decorated film 10 covers the entire surface of the skirt 1 and the ends 11a/11b thereof are fitted end to end. In one variant, the ends 11a/11b of the film 10 are connected by welding. Other variants are described in the present application.

The decorated film 10 preferably comprises at least two layers referred to as inner layer and outer layer in the present application. The outer layer has a tensile breaking stress greater than 100 $N/mm^2$ and preferably greater than 150 $N/mm^2$ and at the same time a melting point of greater than 175° C. and preferably greater than 200° C. The characteristics of the outer layer of the film 10 contribute to the elastic behavior of the skirt 1, but also contribute to the stability of the decorated film 10 during assembly on the extruded main layer 9. The thickness of the outer layer of the film 10 is between 10 and 80 microns and preferably between 10 and 30 microns.

The decorated film 10 comprises the inner layer located between the main layer 9 and the outer layer of the film 10 and ensures the welding of the film 10 to the extruded main layer 9. The resin or resin mixture of which the inner layer of the film 10 is composed enables adhesion by melting the interface of the inner layer of the film 10 under the effect of the heat provided by the main layer 9 in the melt state. The inner layer of the film 10 is preferably composed of a low-density polyethylene having a melting point of less than 120° C. and preferably less than 110° C. The inner layer of the film 10 has a thickness of between 5 and 50 microns and preferably between 15 and 30 microns.

The ratio of the stiffness moduli (ISO 527-1) of the materials composing the outer layer of the film 10 and the main layer 9 is greater than 3 and preferably greater than 7. It has been observed that the stiffness ratio made it possible to unexpectedly improve the elasticity of the skirt 1 without significantly modifying the feeling of stiffness of the packaging.

The invention offers several advantages with respect to the appearance of the finished container. For example, it is possible to produce a glossy or matte surface of the skirt 1 by modifying the choice of the film 10. For example, in order to obtain a matte surface of the skirt 1, an additional layer made of polyethylene or polypropylene will be added to form the outer surface of the film 10 and of the skirt 1. The invention makes it possible to obtain a complete decoration of the skirt of the tube. According to one embodiment of the invention, the film 10 extends around the whole of the body of the tube in the radial direction. By selecting a film having the appropriate tensile strength and thermal properties, it is possible to apply the film such that it completely surrounds the tube in the radial direction without leaving space between the edges of the film or such that the edges of the film overlap. It is thus possible to produce a continuous pattern or uninterrupted text which extends radially around the body of the tube, without a visible seam between the edges of the decorated film 10.

It may also be appropriate for the film to cover the whole of the body of the tube in the axial direction, that is to say from the edge of the shoulder to the end closure. The decorated film 10 can be used to cover the entire body of the tube, which was not possible with the labeling technique previously used for extruded plastic tubes. The invention therefore makes it possible to improve the decoration and the esthetics of these tubes.

In accordance with the invention, it is possible to extend the film 10 in the axial direction of the tube as far as the end closure on the body of the tube. This means that it is possible to achieve complete coverage of the body of the tube with the decorated film 10 even when the end closure of the tube body has a non-linear curved shape or an angular shape. With labels applied subsequently, the adaptation of the shape to a non-linear end closure requires a degree of synchronization which, in practice, makes labeling impossible. Non-linear end closures are used for decorative purposes and to provide the tube with a designed appearance, which may be desirable in the packaging of cosmetic products or the like. A non-linear end closure may also advantageously be used to form a wider welded portion in which an opening or hook can be arranged, which serves as a means for hanging the tube, on a shelf or in a bathroom, for example.

Another advantage of applying the decorated film 10 during the extrusion process results from the fact that, in the axial direction, the edge of the decorated film is absent from the transition between the tube head and the tube body. The transition between the tube head and the skirt 1 forms a smooth surface, unlike tubes labeled after extrusion. In addition, the skirt 1 having the decorated film 10 on the surface may cover the portion of the tube head that connects the cylindrical portion to the conical portion of the head. An also conical portion of the tube head may also be covered without the formation of folds or esthetic defects related to the film or the decoration.

The tube according to the invention has an excellent barrier to water vapor and to oxygen. The water vapor barrier of the skirt is less than 0.1 and preferably less than 0.05 g/skirt/day/100% $H_2O$. The skirt also has an oxygen permeability of less than 4 $cm^3$/skirt/day/bar, and preferably less than 0.05. Advantageously, the oxygen barrier is provided by the film. Numerous solutions exist to provide oxygen barrier properties. For example, the film may contain a layer of biaxially oriented PET, optionally metallized or with an SiOx coating. Other barrier layers, such as layers of EVOH, PA, PVDC, aluminum widely used in the field of packaging, may also be used.

In one variant, the film 10 may be formed of a structure comprising a metallic barrier layer, for example made of aluminum. The film may for example be of the following structure: PET/Alu/PE. Equivalent variants are of course possible.

Figure 4:
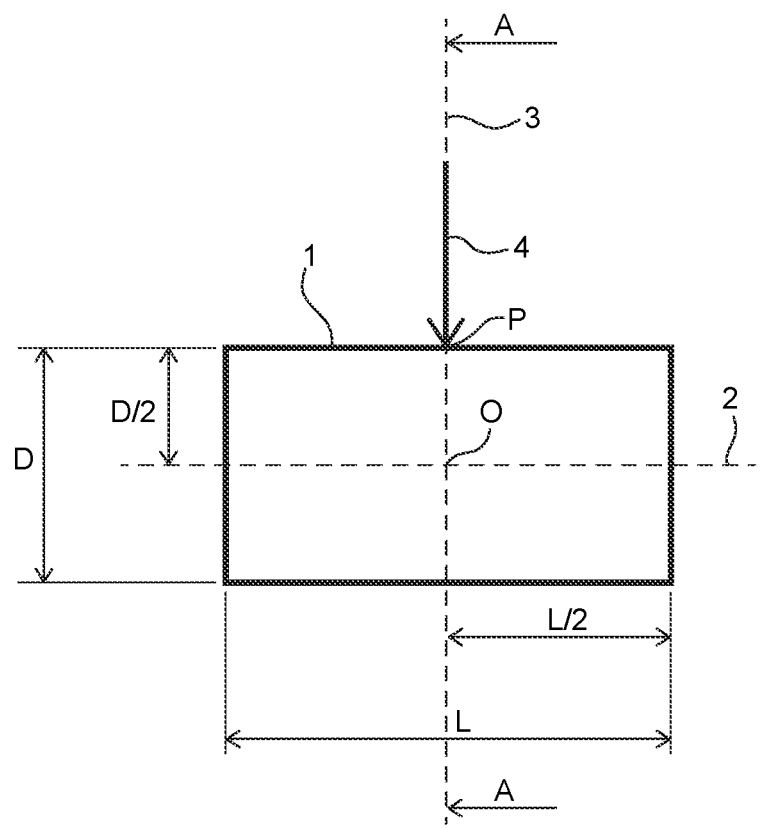
FIG. 4 illustrates a front view of a sample of cylindrical skirt subjected to deformation.

Examples and embodiments of skirts for forming tubes according to the present invention and as described in the present application are illustrated in FIGS. 1 and 2a to 2d which are views along sections perpendicular to the longitudinal axis (as in FIG. 4).

In FIG. 1, a first embodiment of cylindrical skirt 1 therefore comprises the main layer 9 covered by the film 10, the ends 11a/11b of the film 10 being arranged end to end.

Figure 2A:
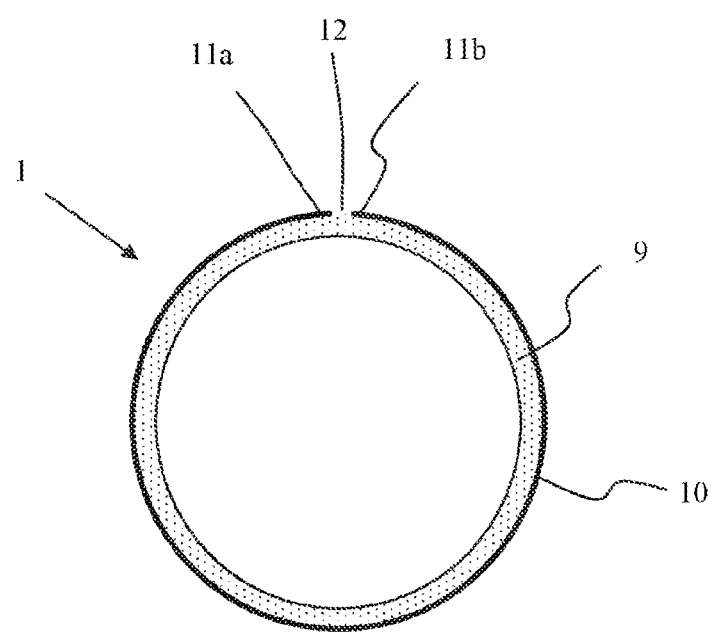

FIGS. 2a, 2b, 2c and 2d describe other embodiments of skirts according to the invention. For example, FIG. 2a illustrates an embodiment in which the ends 11a/11b of the film 10 are not arranged end to end, such that a space 12 is present between said ends of the film 11a and 11b.

Figure 2B:
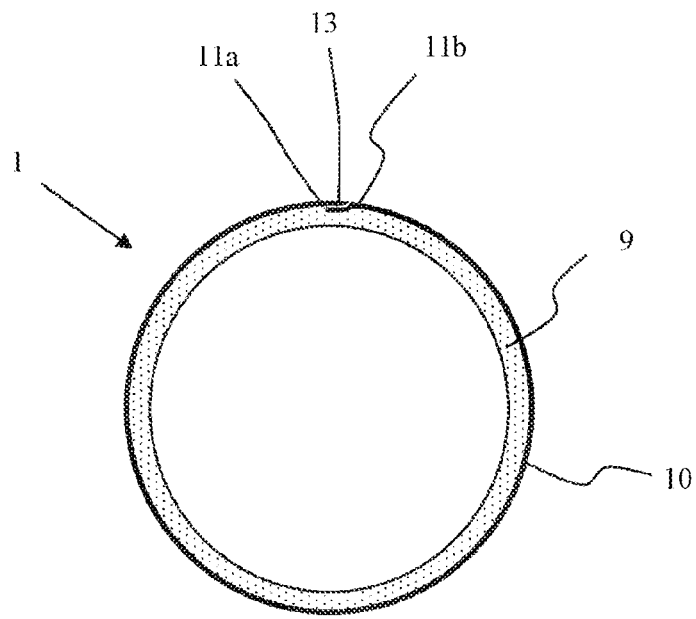

FIG. 2b illustrates an embodiment in which there is a superposition 13 of the ends 11a and 11b of the film 10. Preferentially, the ends are welded or adhesively bonded to one another in this embodiment.

Figure 2C:
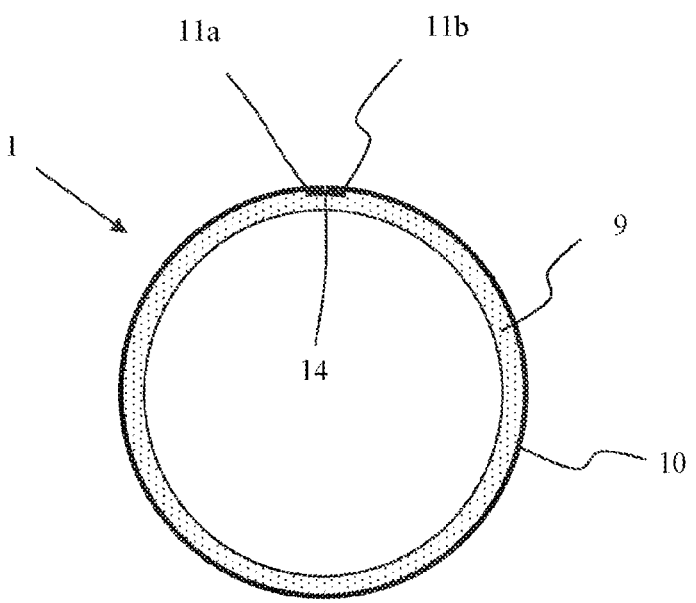

FIG. 2c illustrates an embodiment in which a reinforcing strip 14 is added between the main layer 9 and the film 10.

Preferably, the lower face of the reinforcing strip 14 is welded during the extrusion of the main layer 9. Also preferably, the upper face of the reinforcing strip 14 is welded or adhesively bonded to the ends 11a and 11b of the film.

Figure 2D:
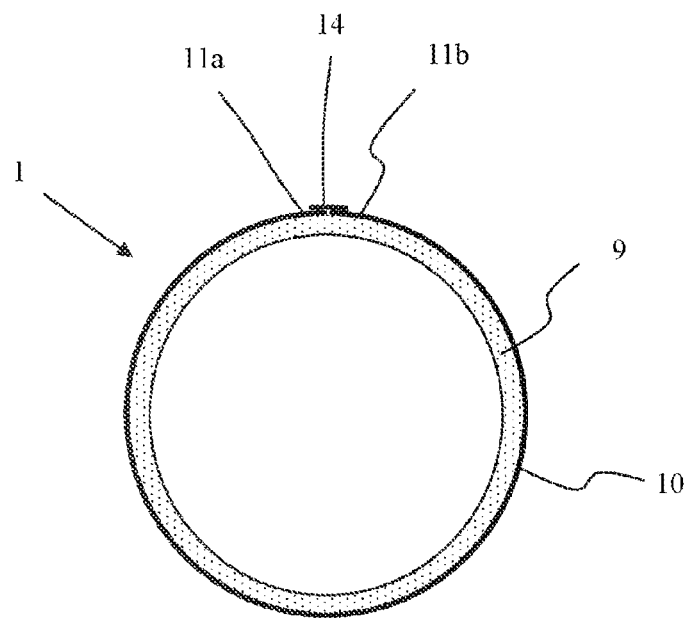

FIG. 2d illustrates another embodiment using a reinforcing strip 14 but in this case the strip 14 is placed on the outside of the film 10. Also preferably, the lower face of the reinforcing strip 14 is welded or adhesively bonded to the ends 11a and 11b of the film.

Of course, these are examples of embodiments and other equivalent configurations and variants are possible. For example, the reinforcing strip may be used on all embodiments of skirts described and illustrated.

Preferably, the reinforcing strip 14 has a structure similar to that of the film 10 in order to ensure the continuity of the mechanical and barrier properties.

The structure thereof is suited to the requirement for welding or adhesive bonding on each of its faces. It has a small thickness, preferably of the same order as the thickness of the film 10.

For example, the thickness thereof is between 10 and 120 microns and preferably between 30 and 80 microns.

As examples of material for the structure of the reinforcing strip, the following can be envisioned: PE/PET/PE or PE/PET/PE-EVOH-PE. Other equivalent materials are of course possible.

Figure 3:
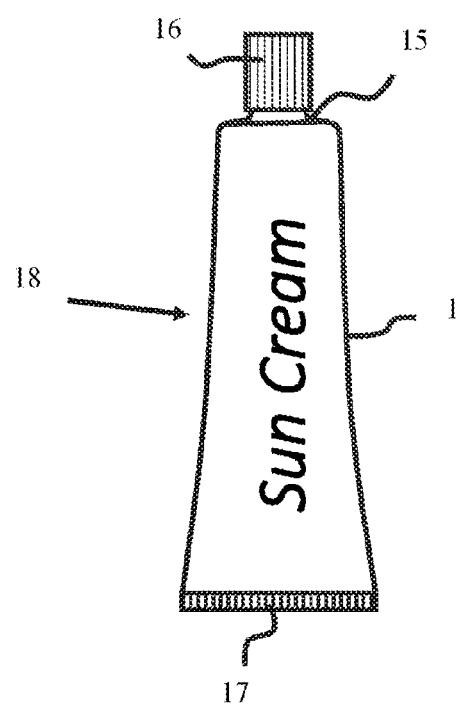
FIG. 3 illustrates a tube as an example of application of the present invention.

An example of a tube 18 according to the present invention is illustrated schematically in FIG. 3. The tube 18, for example packaging tube, comprises the skirt 1 according to the present invention, a tube shoulder 15 with a neck, a cap and an end weld 17 for closing the tube 18.

The tube 18 produced according to the invention also comprises unexpected elasticity properties. For the packaging tubes used in the field of cosmetic products in particular, great importance is attached to the appearance of the packaging before and during use thereof. In this market, consumers particularly wish for the tube to recover its shape after partial or total emptying of the product. This elasticity of the skirt 1, which causes the tube 18 to return to its initial shape following the discharge of the product, requires an elastic return force of the wall of the tube. This force must be sufficient to counteract the viscosity forces of the packaged product that oppose the entry of air into the packaging. It is quite intuitive to understand that the viscosity of the packaged product which obstructs the orifice generates a force opposing the entry of air into the tube. It is therefore important to be able to adjust the elastic return properties of the tube depending on the viscosity of the packaged product.

Extruded tubes according to the prior art have a high resistance to stress cracking which is necessary for the preservation of cosmetic formulas. However, the elasticity of these extruded tubes is sometimes insufficient for particularly viscous products. The current method for increasing the elastic return of extruded polyethylene tubes consists in increasing the thickness of the wall of the tube or adjusting the polyethylene mixture. Increasing the content of HDPE in the mixture is usually used to increase the stiffness and hence the return force of the wall of the tube. However, increasing the content of HDPE simultaneously causes a decrease in the resistance to stress cracking of the packaging. Increasing the thickness of the wall is also not a solution, for economical and environmental reasons. It has been found that the combination of a main layer having a tensile modulus of less than 1200 N/mm$^2$ and preferably less than 500 N/mm$^2$ with a single-layer or multilayer film having a tensile modulus of greater than 3500 N/mm$^2$ gives the skirt an unexpected elastic return force.

There is no standard for measuring the elastic behavior of packaging tube skirts. Usually, those skilled in the art evaluate the elastic nature of tube skirts by "manual" comparison by deforming the packaging by hand and observing its behavior. This method has a number of drawbacks because it does not make it possible to provide numerical and reproducible data and it varies as a function of the perception of the person performing the test. In order to overcome this difficulty, a reproducible method for measuring the elastic behavior has been developed.

The elastic behavior of the skirts is measured according to the procedure described below. A sample of cylindrical skirt with an L/D ratio of 1.714 is taken for the measurement; L representing the length of the skirt in the axial direction and D the outer diameter thereof.

FIG. 4 represents a sample of cylindrical skirt 1 of diameter D and length L, the axis 2 of the cylindrical sample being arranged horizontally. A deformation 4 of the sample 1 is imposed at the point P located halfway between the ends of the sample along the axis 2. Initially, the point P is located at the distance D/2 of the axis 2, measured along the axis 3. The axis 3 is perpendicular to the axis 2 and intersects the axis 2 at the point O.

Figure 5:
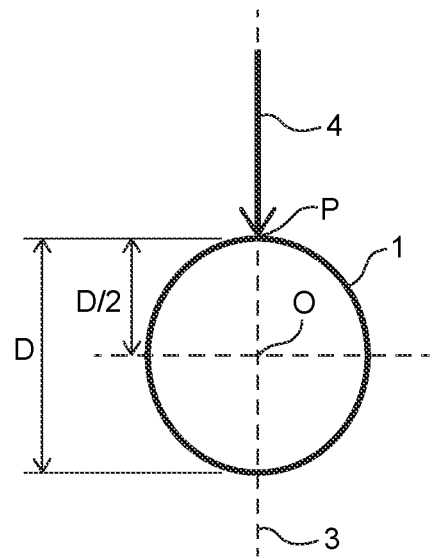
FIG. 5 illustrates a sectional view along the axis A-A of the sample of FIG. 3.

FIG. 5 illustrates the sample 1 according to the perpendicular view A. The measurement of the elastic nature consists in imposing a deformation of the sample 1 at the point P along the axis 3 by virtue of the machine element 4.

The sample is deformed at a speed of 2 mm/s according to the following cycle:

Loading phase 5: deformation of the sample at 2 mm/s up to the point O. The machine element 4 moves vertically along the axis 3 and takes the point P of the skirt with it. The travel of the point P of the skirt is equal to D/2 at the end of the loading phase.

Unloading phase 6: The machine element 4 rises along the axis 3 up to the initial position at a rate of 2 mm/s.

Figure 6:
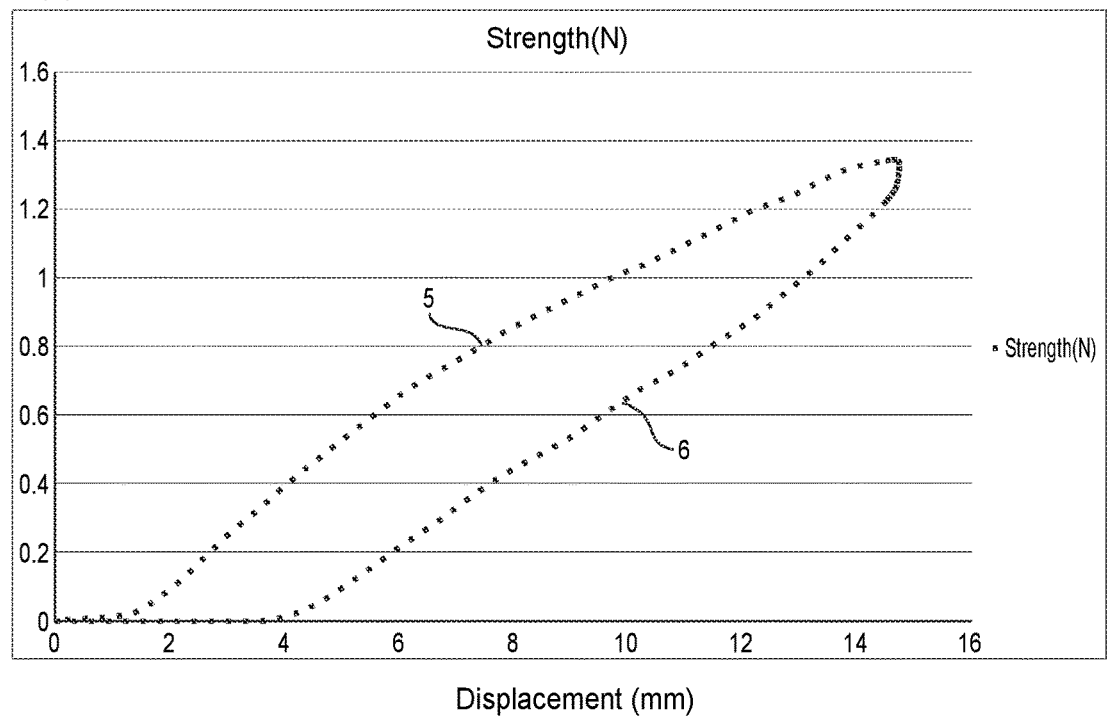
FIG. 6 illustrates an example of the deformation of the sample during a loading and unloading phase.
Figure 7:
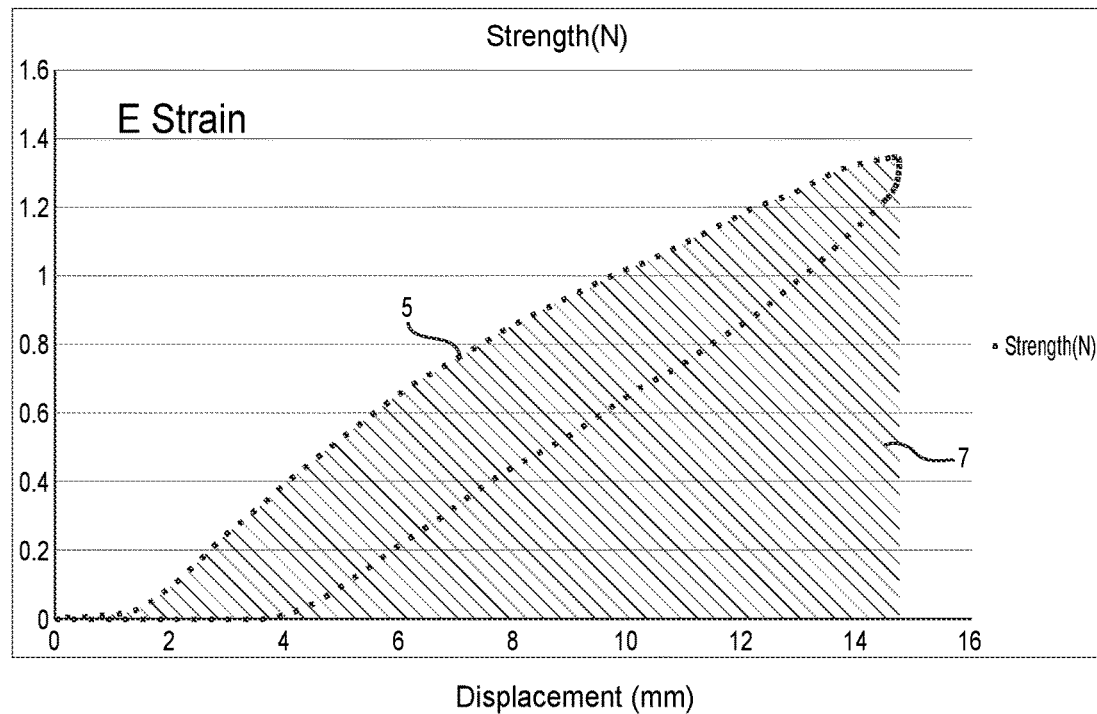
FIG. 7 illustrates the strain energy required to achieve the deformation of the sample during a loading and unloading phase.

The force as a function of the displacement of the point P is recorded during the cycle and the type of graph obtained is illustrated in FIG. 6.

The energy required to deform the sample 1 from the initial position to the point O is calculated. The strain energy is illustrated in FIG. 6 by the area 7 under the loading curve 5. The strain energy measured depends mainly on the stiffness of the skirt. The stiffer the skirt, the higher the strain energy measured. A high strain energy may be desired when viscous products are present in the packaging.

Figure 8:
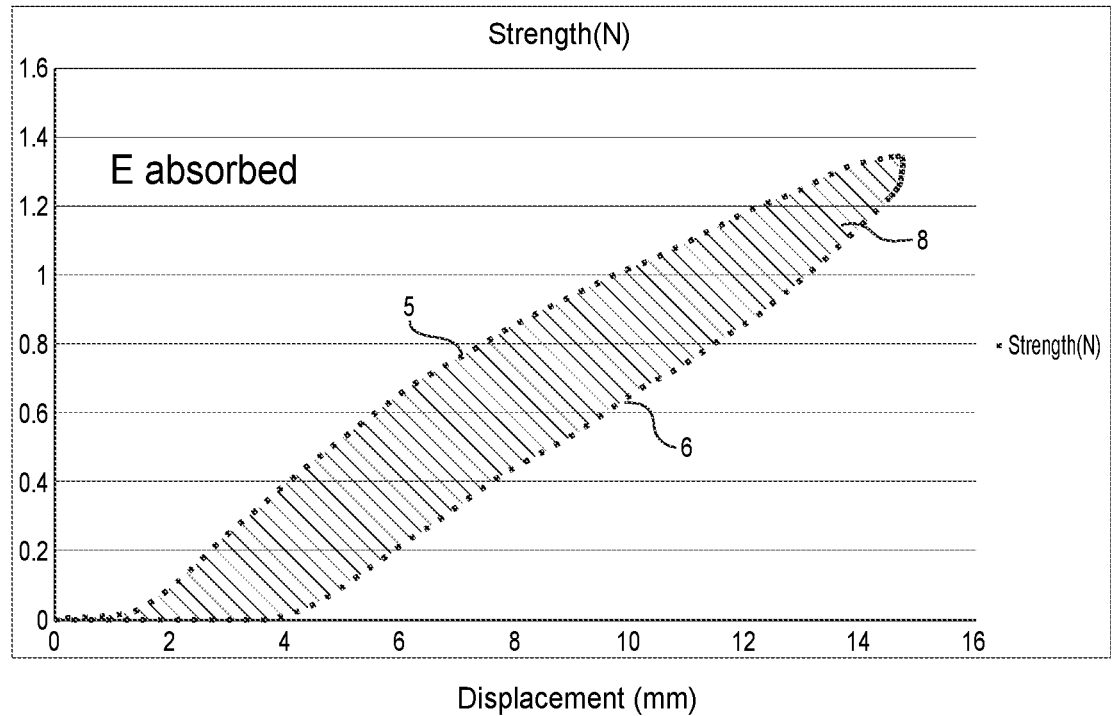
FIG. 8 illustrates the energy absorbed during a loading and unloading phase.

The energy absorbed 8 by the sample 1 during a loading cycle 5 and an unloading cycle 6 is illustrated in FIG. 8. The energy absorbed 8 corresponds to the difference between the strain energy 7 during loading 5 and the elastic return energy during unloading 6. The energy absorbed 8 characterizes the behavior of the sample 1.

Figure 9:
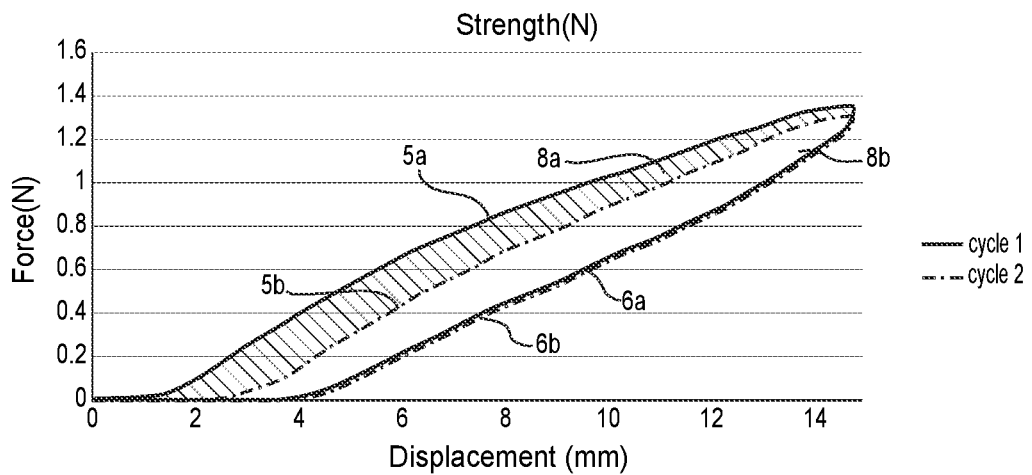
FIG. 9 illustrates two deformation cycles of a sample.

The elasticity of the sample 1 is determined following the consecutive sequence of two deformation cycles as defined above. The second deformation cycle is started sequentially without interruption, as soon as the machine element 4 has returned to the starting position. An example of the result obtained following two cycles of deformation of the sample 1 is illustrated in FIG. 9. The energy absorbed 8a during the first cycle corresponds to the area between the loading curve 5a and the unloading curve 6a. Likewise, the energy absorbed 8b during the second cycle corresponds to the area between the loading curve 5b and the unloading curve 6b. It is observed that the energy absorbed 8b during the second cycle is lower than the energy absorbed 8a during the first cycle because the sample 1 has not returned to the initial position between the two cycles. This result indicates that the sample has not regained the initial shape between the two consecutive deformation cycles.

The elastic behavior of the sample 1 is characterized by the ratio of the energy absorbed 8b during the cycle 2 to the energy absorbed 8a during the cycle 1. The more the absorbed energy ratio tends towards 1, the more the behavior is elastic, which indicates that the tube skirt returns to its initial geometry after deformation. Conversely, if the absorbed energy ratio tends towards 0, this indicates that the tube skirt is not very elastic and that therefore the packaging remains deformed and does not recover its initial shape.

The invention makes it possible to obtain extruded tube skirts having an unexpected elastic behavior. The packaging made with these skirts retains its shape for the entire duration of use, regardless of the amount of product remaining inside the packaging. It is highly advantageous to use this packaging for cosmetic products in particular. The unexpected behavior is illustrated by the examples below.

Example 1 (Tube According to the Current State of the Art)

A skirt of diameter 35 mm and thickness 480 microns is obtained by extrusion of a mixture of 45% HDPE Hostalen GF 4750 with 45% LDPE ExxonMobil 165 and 10% LLDPE Dowlex 2045 G. A sample of this skirt is taken and measured according to the method explained previously. For a skirt of diameter D=35 mm, the length of the measured sample is equal to 60 mm (L=60 mm). The L/D ratio of the sample is equal to 1.714. The absorbed energy ratio of this skirt, which illustrates the elastic behavior, is equal to 67% and the strain energy of the skirt, which illustrates the stiffness, is equal to 63 N·mm.

Example 2

A skirt 1 with a diameter of 35 mm and a thickness of 480 microns is produced according to the invention. The main layer 9 of thickness 430 microns is composed of 100% LDPE ExxonMobil 165. The main layer represents 89.5% of the thickness of the skirt. The inner layer of the 26 micron-thick film 10 is composed of an LDPE. The outer layer of the film 10 is a 24 micron-thick metallized biaxially oriented PET. The outer surface of the outer layer, which also forms the outer face of the skirt 1, is decorated. A 60 mm long sample of skirt is taken. The L/D ratio of the sample is equal to 1.714. The absorbed energy ratio of this skirt, which illustrates the elastic behavior, is equal to 80% and the strain energy of the skirt, which illustrates the stiffness, is equal to 61 N·mm.

The skirt 1 obtained according to the invention (example 2) has an elasticity greater than the skirt obtained according to the prior art (example 1). The invention makes it possible to obtain improved elasticity for skirts of the same thickness and of the same stiffness.

The embodiments described in the present application are illustrative examples and should not be considered to be limiting. Other embodiments may use equivalent materials or means to those described for example. The embodiments may also be combined with one another depending on the circumstances, or means used in one embodiment can be used in another embodiment. The dimensions are also given by way of examples or of preferred values and may vary depending on the circumstances. Likewise, the materials shown are shown by way of illustrative examples and other equivalent or suitable materials are conceivable.

In the present description, reference is mainly made to skirts used to form tubes 18, but other applications are of course possible within the context of the present invention.

The invention claimed is:

1. A multilayer flexible tube skirt comprising:
   an extruded main layer; and
   a single-layer or multilayer film at least partially surrounding the extruded main layer forming an outer layer and being direct contact with the extruded main layer,
   wherein a tensile modulus of the extruded main layer is less than 1200 N/mm$^2$ and a tensile modulus of the single-layer or multilayer film is greater than 3500 N/mm$^2$.

2. The skirt as claimed in claim 1, wherein the tensile modulus of the main layer is less than 500 N/mm$^2$.

3. The skirt as claimed in claim 1, wherein a thickness of the main layer is between 80% and 97% of a thickness of the skirt.

4. The skirt as claimed in claim 1, wherein a thickness of the main layer is between 190 microns and 680 microns.

5. The skirt as claimed in claim 1, wherein a thickness of the main layer is between 250 microns and 550 microns.

6. The skirt as claimed in claim 1, wherein a thickness of the skirt is between 200 microns and 700 microns.

7. The skirt as claimed in claim 1, wherein the main layer is composed of
   45% HDPE Hostalen GF 4750 MFR: 0.4 g/10 min;
   45% LDPE ExxonMobil 165 MFR: 0.33 g/10 min; and
   10% LLDPE Dowlex 2045 G MFR: 1 g/10 min.

8. The skirt as claimed in claim 1, wherein the main layer is composed of
   80% LDPE ExxonMobil 165 MFR: 0.33 g/10 min; and
   20% LLDPE Dowlex 2045 G MFR: 1 g/10 min.

9. The skirt as claimed in claim 1, wherein the skirt has an absorbed energy ratio that is greater than 60%.

10. The skirt as claimed in claim 1, wherein ends of the multilayer film are arranged end to end.

11. The skirt as claimed in claim 1, wherein ends of the multilayer film have a space between them.

12. The skirt as claimed in claim 1, wherein ends of the multilayer film are arranged to overlap.

13. The skirt as claimed in claim 1, wherein the main layer is multilayer and coextruded.

14. The skirt as claimed in claim 1, wherein the main layer includes an oxygen barrier layer.

15. The skirt as claimed in claim 1, wherein the barrier layer includes a layer comprising an EVOH resin.

16. The skirt as claimed in claim 1, wherein the main layer includes a layer of recycled material.

17. The skirt as claimed in claim 1, wherein the multilayer film includes a multilayer structure.

18. The skirt as claimed in claim 1, wherein the multilayer film includes two layers, at least one of which has a tensile modulus greater than 3500 N/mm$^2$.

19. The skirt as claimed in claim 18, wherein the other of the two layers of the multilayer film has a tensile modulus greater than 100 N/mm$^2$.

20. The skirt as claimed in claim 1, further comprising:
   a strip that is added to the ends of the multilayer film.

21. The skirt as claimed in claim 20, wherein the strip is arranged between the main layer and the multilayer film, or on top of the multilayer film.

22. The skirt as claimed in claim 1, wherein the multilayer film includes an oxygen barrier layer.

23. The skirt as claimed in claim 22, wherein the oxygen barrier layer includes at least one layer from the group consisting of EVOH resin layer, a metallized layer, and a metal layer.

24. The skirt as claimed in claim 23, wherein the oxygen barrier layer is the metal layer that includes aluminum.

* * * * *